United States Patent
Son

(10) Patent No.: US 11,322,306 B2
(45) Date of Patent: May 3, 2022

(54) COMPOSITE ELECTRONIC COMPONENT

(71) Applicant: SAMSUNG ELECTRO-MECHANICS CO., LTD., Suwon-si (KR)

(72) Inventor: Soo Hwan Son, Suwon-si (KR)

(73) Assignee: SAMSUNG ELECTRO-MECHANICS CO., LTD., Gyeonggi-do (KR)

(*) Notice: Subject to any disclaimer, the term of this patent is extended or adjusted under 35 U.S.C. 154(b) by 60 days.

(21) Appl. No.: 16/872,673

(22) Filed: May 12, 2020

(65) Prior Publication Data

US 2021/0159015 A1   May 27, 2021

(30) Foreign Application Priority Data

Nov. 25, 2019  (KR) .......................... 10-2019-0152179

(51) Int. Cl.
*H01G 4/30* (2006.01)
*H01G 4/232* (2006.01)
(Continued)

(52) U.S. Cl.
CPC .............. *H01G 4/30* (2013.01); *H01G 2/065* (2013.01); *H01G 4/012* (2013.01); *H01G 4/1218* (2013.01); *H01G 4/232* (2013.01)

(58) Field of Classification Search
CPC ............ H01G 4/232; H01G 4/40; H01G 4/30; H01G 4/065; H01G 4/012; H01G 4/1218; H01G 4/32
See application file for complete search history.

(56) References Cited

U.S. PATENT DOCUMENTS

2013/0194715 A1* 8/2013 Kim ..................... H01G 4/1218
                                                                361/301.4
2013/0284507 A1* 10/2013 Hattori ................... H05K 1/181
                                                                174/260
(Continued)

FOREIGN PATENT DOCUMENTS

JP          5012658 B2    6/2012
JP       2015-185651 A   10/2015
(Continued)

OTHER PUBLICATIONS

Notice of Office Action issued in corresponding Korean Patent Application No. 10-2019-0152179 dated Feb. 23, 2021, with English translation.

*Primary Examiner* — Michael P McFadden
(74) *Attorney, Agent, or Firm* — Morgan, Lewis & Bockius LLP

(57) ABSTRACT

A composite electronic component includes a composite body including a multilayer ceramic capacitor and a ceramic chip coupled to each other. The multilayer ceramic capacitor includes a first ceramic body in which dielectric layers and internal electrodes disposed to face each other with one of the dielectric layers interposed therebetween are stacked, and first and second external electrodes disposed on opposite end portions of the first ceramic body, respectively. The ceramic chip is disposed below the multilayer ceramic capacitor, and includes a second ceramic body including ceramic and first and second terminal electrodes disposed on opposite end portions of the second ceramic body, respectively, and connected to the first and second external electrodes, respectively. A ratio (T1/T2) of a thickness (T1) of the multilayer ceramic capacitor to a thickness (T2) of the ceramic chip satisfies $1.6 \leq (T1/T2) \leq 3.5$.

15 Claims, 4 Drawing Sheets

(51) Int. Cl.
*H01G 2/06* (2006.01)
*H01G 4/12* (2006.01)
*H01G 4/012* (2006.01)

(56) References Cited

U.S. PATENT DOCUMENTS

| | | | |
|---|---|---|---|
| 2013/0321981 A1* | 12/2013 | Ahn | H01G 2/065 |
| | | | 361/321.2 |
| 2014/0022692 A1* | 1/2014 | Yoon | H01G 4/12 |
| | | | 361/301.4 |
| 2015/0200054 A1 | 7/2015 | Lee et al. | |
| 2015/0270065 A1 | 9/2015 | Hattori et al. | |
| 2016/0007446 A1* | 1/2016 | Ishikawa | H01G 4/30 |
| | | | 174/260 |
| 2016/0093439 A1 | 3/2016 | Fujita et al. | |
| 2016/0309578 A1* | 10/2016 | Park | H01G 4/232 |
| 2018/0075975 A1* | 3/2018 | Hattori | H01G 4/30 |
| 2019/0069410 A1 | 2/2019 | Byun et al. | |

FOREIGN PATENT DOCUMENTS

| | | | |
|---|---|---|---|
| JP | 2016-72603 A | 5/2016 |
| KR | 10-2015-0084078 A | 7/2015 |
| KR | 10-2017-0028610 A | 3/2017 |
| KR | 10-2019-0021081 A | 3/2019 |

* cited by examiner

II-II'

COMPOSITE ELECTRONIC COMPONENT

CROSS-REFERENCE TO RELATED APPLICATION(S)

This application claims benefit of priority to Korean Patent Application No. 10-2019-0152179 filed on Nov. 25, 2019 in the Korean Intellectual Property Office, the disclosure of which is incorporated herein by reference in its entirety.

TECHNICAL FIELD

The present disclosure relates to a composite electronic component.

BACKGROUND

A multilayer ceramic capacitor, a multilayer electronic component, is a chip type condenser mounted on the circuit boards of various electronic products including an image display device, such as, for example, a liquid crystal display (LCD), a plasma display panel (PDP), and the like, as well as a computer, a personal digital assistant (PDA), a cellular phone, and the like, serving to charge or discharge electricity therein or therefrom.

The multilayer ceramic capacitor (MLCC) may be used as a component of various electronic apparatuses, since it has a small size, implements high capacitance, and is easily mounted.

The multilayer ceramic capacitor may have a structure including a plurality of dielectric layers, and internal electrodes alternately stacked between the dielectric layers and having different polarities.

Since the dielectric layers have piezoelectric and piezoresistive characteristics, a piezoelectric phenomenon may occur between the internal electrodes when a direct current (DC) or alternating current (AC) voltage is applied to the multilayer ceramic capacitor, such that vibrations may be generated therein.

These vibrations are transferred to the circuit board on which the multilayer ceramic capacitor is mounted through external electrodes of the multilayer ceramic capacitor, such that the entirety of the circuit board becomes a sound reflecting surface to generate vibration sound, known as noise.

The vibration sound may correspond to an audio frequency in a range of 20 to 20,000 Hz causing listener discomfort. The vibration sound causing listener discomfort as described above is known as acoustic noise.

Recently, acoustic noise has appeared on a level at which it may be sufficiently recognized by a user as an electronic device is used together with a printed circuit board in an environment in which a voltage is high and a change in the voltage is large, in accordance with recent slimming and miniaturization of the electronic device.

Therefore, a new product in which acoustic noise is decreased has been continuously demanded.

Meanwhile, a composite electronic component in which a ceramic chip is used on a lower surface of a multilayer ceramic capacitor in order to decrease acoustic noise has been studied.

However, specific studies on the degree of removal of acoustic noise according to the size of the multilayer ceramic capacitor, the width of the active portion, the mounting method, and the size of the ceramic chip disposed below have been insufficient. Therefore, research needs to find a critical point according to the size of the multilayer ceramic capacitor, the width of the active portion, the mounting method and the size of the ceramic chip disposed below, and the influence of acoustic noise.

SUMMARY

An aspect of the present disclosure is to provide a composite electronic component that may reduce acoustic noise, and excellent alignment of a multilayer ceramic capacitor.

According to an aspect of the present disclosure, a composite electronic component includes a composite body including a multilayer ceramic capacitor and a ceramic chip coupled to each other. The multilayer ceramic capacitor includes a first ceramic body in which dielectric layers and internal electrodes disposed to face each other with one of the dielectric layers interposed therebetween are stacked, and first and second external electrodes disposed on opposite end portions of the first ceramic body, respectively. The ceramic chip is disposed below the multilayer ceramic capacitor and includes a second ceramic body including ceramic and first and second terminal electrodes disposed on opposite end portions of the second ceramic body, respectively, and connected to the first and second external electrodes, respectively. A ratio ($T1/T2$) of a thickness ($T1$) of the multilayer ceramic capacitor to a thickness ($T2$) of the ceramic chip satisfies $1.6 \leq (T1/T2) \leq 3.5$.

According to another aspect of the present disclosure, a composite electronic component includes a composite body including a multilayer ceramic capacitor and a ceramic chip coupled to each other. The multilayer ceramic capacitor includes a first ceramic body in which dielectric layers and internal electrodes disposed to face each other with one of the dielectric layers interposed therebetween are stacked, and first and second external electrodes disposed on opposite end portions of the first ceramic body, respectively. The ceramic chip is disposed below the multilayer ceramic capacitor and includes a second ceramic body including ceramic and first and second terminal electrodes disposed on opposite end portions of the second ceramic body, respectively, and connected to the first and second external electrodes, respectively. A ratio ($T1/W2$) of a thickness ($T1$) of the multilayer ceramic capacitor to a width ($W2$) of the second ceramic body satisfies 0.8 or more and 1.2 or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
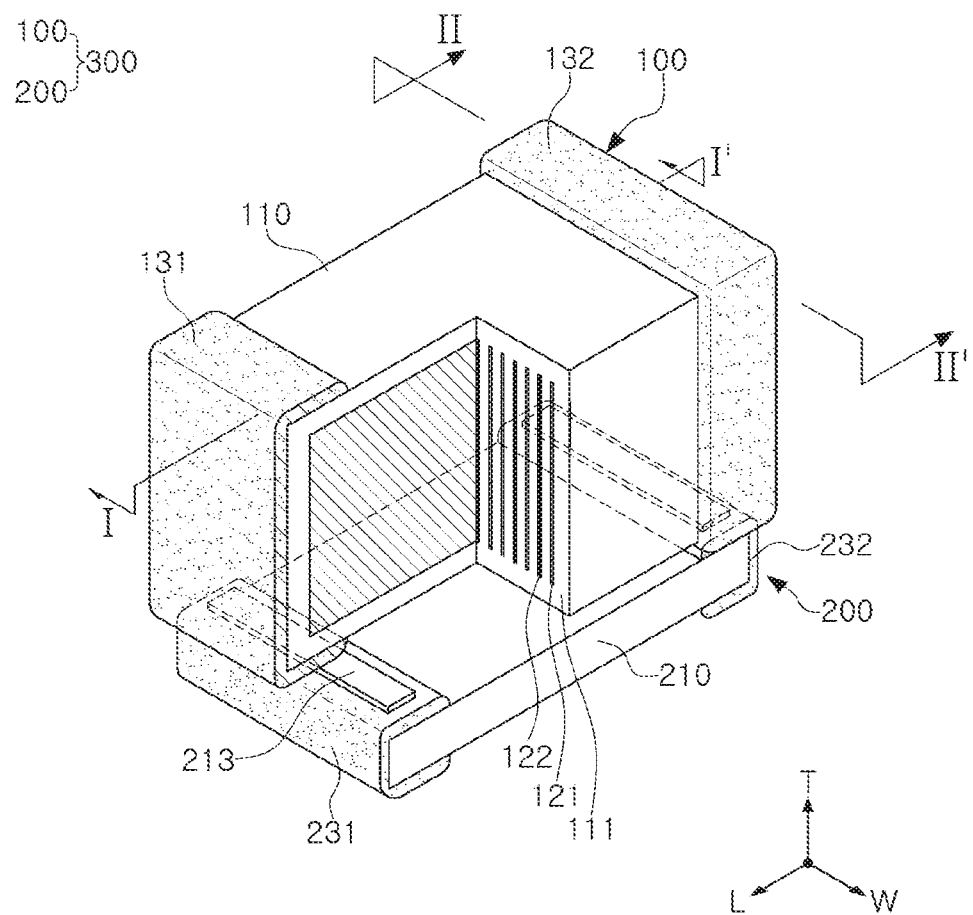
FIG. 1 is a schematic perspective view illustrating a composite electronic component according to a first embodiment of the present disclosure.

Embodiments of the present disclosure may be modified to have various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and elements denoted by the same reference numerals in the drawings may be the same elements.

Composite Electronic Component

Hereinafter, a preferred embodiment of the present disclosure with reference to the accompanying drawings will be described.

FIG. 1 is a schematic perspective view illustrating a composite electronic component according to a first embodiment of the present disclosure.

Figure 2:
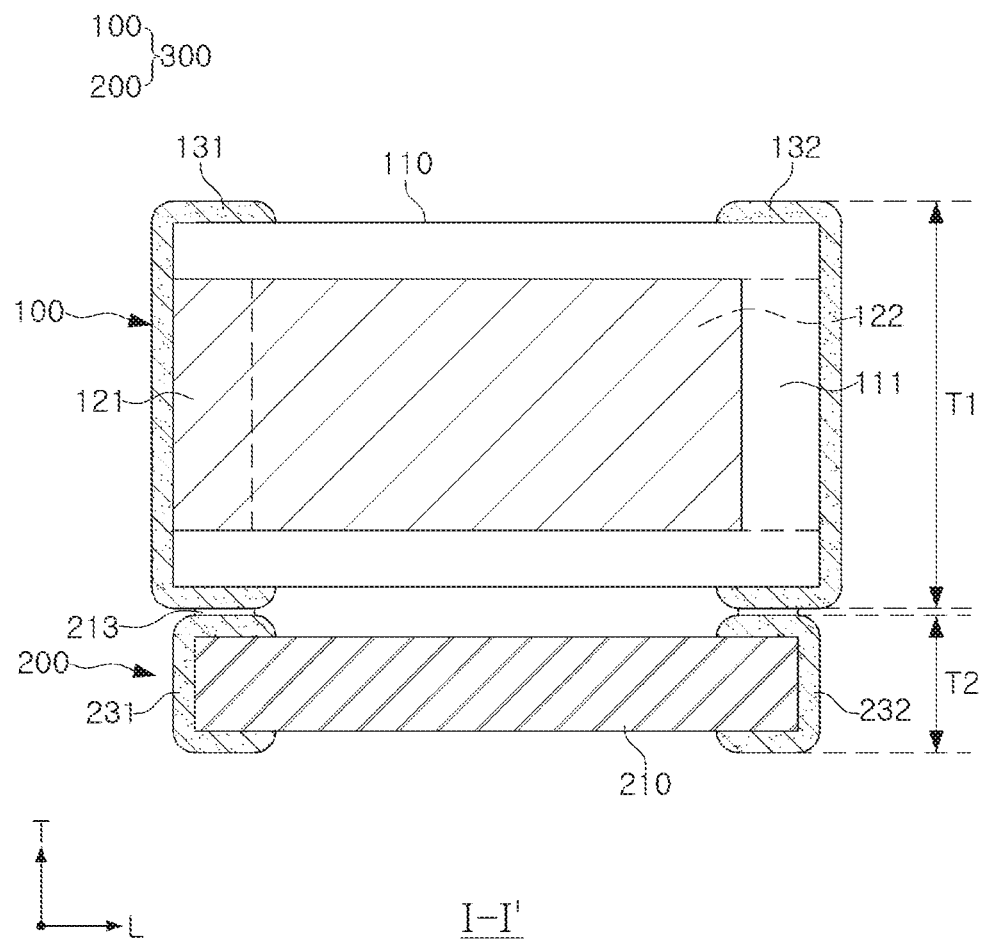
FIG. 2 is a cross-sectional view taken along line I-I' of FIG. 1.

FIG. 2 is a cross-sectional view taken along line I-I' of FIG. 1.

Figure 3:
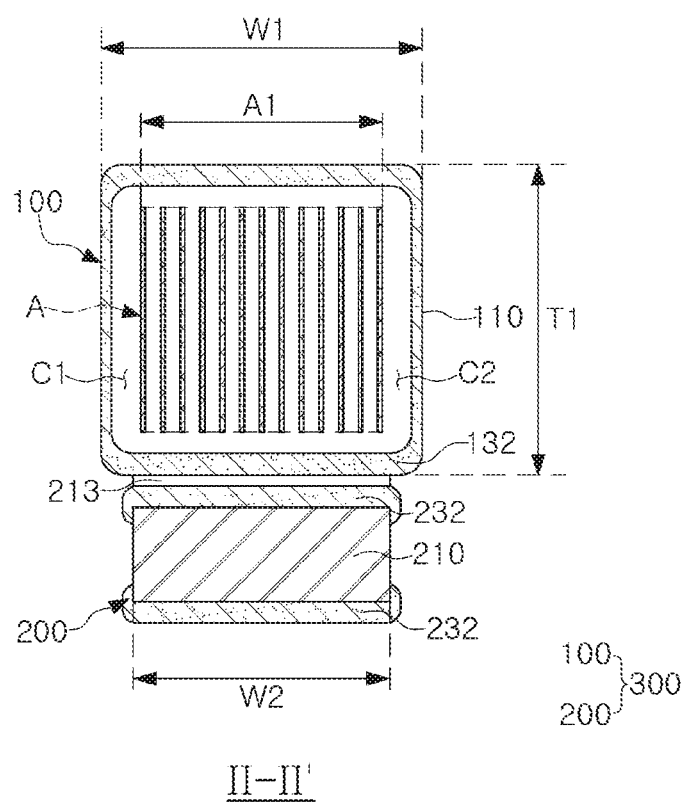
FIG. 3 is a cross-sectional view taken along line II-II' of FIG. 1.

FIG. 3 is a cross-sectional view taken along line II-II' of FIG. 1.

Referring to FIG. 1, in the composite electronic component according to an embodiment of the present disclosure, a 'length direction' refers to an 'L' direction of FIG. 1, a 'width direction' refers to a 'W' direction of FIG. 1, and a 'thickness direction' refers to a 'T' direction of FIG. 1. In this case, the 'thickness direction' may be used as having the same concept as a direction in which dielectric layers of a capacitor are stacked, that is, a 'stacking direction.'

Meanwhile, in an embodiment of the present disclosure, the composite electronic component may have upper and lower surfaces opposing each other, first and second side surfaces connecting the upper and lower surfaces in the length direction, and third and fourth side surfaces connecting the upper and lower surfaces in the width direction. A shape of the composite electronic component is not particularly limited, and may be a hexahedral shape, as illustrated.

In addition, the first and second side surfaces of the composite electronic component in the length direction and the third and fourth side surfaces thereof in the width direction may be the same as first and second side surfaces of a multilayer ceramic capacitor and a ceramic chip in the length direction and third and fourth side surfaces thereof in the width direction, respectively, as described below.

Meanwhile, the composite electronic component may have a form in which the multilayer ceramic capacitor and the ceramic chip are coupled to each other, and when the ceramic chip is coupled to a lower portion of the multilayer ceramic capacitor, an upper surface of the composite electronic component may refer to an upper surface of the multilayer ceramic capacitor, and a lower surface of the composite electronic component may refer to a lower surface of the ceramic chip.

Referring to FIGS. 1 and 2, a composite electronic component according to an embodiment of the present disclosure may include a composite body 300 formed by coupling a multilayer ceramic capacitor 100 and a ceramic chip 200 to each other, the multilayer ceramic capacitor 100 including a first ceramic body 110 in which a plurality of dielectric layers and internal electrodes 121 and 122 disposed to face each other with each of the dielectric layers interposed therebetween are stacked, and first and second external electrodes 131 and 132 disposed on opposite end portions of the first ceramic body 110, respectively, and the ceramic chip 200 being disposed below the multilayer ceramic capacitor 100 and including a second ceramic body 210 including ceramic and first and second terminal electrodes 231 and 232 disposed on opposite end portions of the second ceramic body 210, respectively, and connected to the first and second external electrodes 131 and 132, respectively.

The ceramic may include alumina ($Al_2O_3$).

Generally, there has been an attempt to insert an intermediate medium between a multilayer ceramic capacitor and a printed circuit board in order to suppress vibrations of the multilayer ceramic capacitor from being transferred to the printed circuit board.

The intermediate medium, generally a resin used to manufacture the printed circuit board, may be formed of a material having elasticity, and may thus serve to absorb the vibrations of the multilayer ceramic capacitor by elasticity thereof.

According to the first embodiment of the present disclosure, since the second ceramic body 210 of the ceramic chip 200 is only formed of a ceramic including hard alumina ($Al_2O_3$) that is not elastically deformed, the printed circuit board and the multilayer ceramic capacitor 100 may be spaced apart from each other by the ceramic chip 200. Therefore, the transfer of vibrations themselves generated by the multilayer ceramic capacitor 100 may be blocked.

According to an embodiment of the present disclosure, a ratio (T1/T2) of a thickness (T1) of the multilayer ceramic capacitor 100 to a thickness (T2) of the ceramic chip 200 may satisfy $1.6 \leq (T1/T2) \leq 3.5$.

Conventionally, a composite electronic component in which a ceramic chip is used on a lower surface of a multilayer ceramic capacitor in order to decrease acoustic noise has been studied.

In order to reduce acoustic noise, there have been studies of a composite electronic component using a substrate on a lower surface of a multilayer ceramic capacitor.

However, specific studies on the degree of removal of acoustic noise according to the size of the multilayer ceramic capacitor, the width of the active portion, the mounting method, and the size of the ceramic chip disposed below has been insufficient. Therefore, research needs to find a critical point according to the size of the multilayer ceramic capacitor, the width of the active portion, the mounting method and the size of the ceramic chip disposed below, and the influence of acoustic noise, and according to an embodiment of the present disclosure, numerical values regarding such a critical point may be provided.

Specifically, in the first embodiment of the present disclosure, the ratio (T1/T2) of the thickness (T1) of the multilayer ceramic capacitor 100 to the thickness (T2) of the ceramic chip 200 may be controlled to satisfy $1.6 \leq (T1/T2) \leq 3.5$, to significantly reduce acoustic noise.

In general, it was confirmed through experimentation that as the thickness of the ceramic chip is increased, acoustic noise tends to be reduced, but the thickness of the ceramic chip may have the maximum effect of reducing the acoustic noise, depending on the thickness of the multilayer ceramic capacitor disposed on the ceramic chip.

According to the first embodiment of the present disclosure, the ratio (T1/T2) of the thickness (T1) of the multilayer ceramic capacitor 100 to the thickness (T2) of the ceramic chip 200 may be controlled to satisfy $1.6 \leq (T1/T2) \leq 3.5$, to minimize influence of the acoustic noise generated in the multilayer ceramic capacitor 100, and to improve a mounting failure rate at the same time.

When the ratio (T1/T2) of the thickness (T1) of the multilayer ceramic capacitor 100 to the thickness (T2) of the ceramic chip 200 is less than 1.6, the acoustic noise may be reduced, but the probability of failure due to collapse during mounting may be high, since the size of the composite body 300 is larger in the thickness direction than in the width direction.

When the ratio (T1/T2) of the thickness (T1) of the multilayer ceramic capacitor 100 to the thickness (T2) of the ceramic chip 200 exceeds 3.5, there may be a problem in that an effect of reducing the acoustic noise is insufficient.

According to the first embodiment of the present disclosure, the first ceramic body 110 may include an active portion A including the plurality of internal electrodes 121 and 122 disposed to face each other with the dielectric layer 111 interposed therebetween, to form capacitance, and cover portions C1 and C2 formed on opposing sides of the active portion A. A ratio (A1/W2) of a width (A1) of the active portion A to a width (W2) of the second ceramic body 210 of the ceramic chip 200 may satisfy less than 1.2.

More preferably, the ratio (A1/W2) of the width (A1) of the active portion A to the width (W2) of the second ceramic body 210 of the ceramic chip 200 may satisfy 0.8 or more and 1.0 or less.

The width (A1) of the active portion A may refer to a distance between outermost internal electrodes 121 and 122 among the plurality of internal electrodes 121 and 122.

The ratio (T1/T2) of the thickness (T1) of the multilayer ceramic capacitor 100 to the thickness (T2) of the ceramic chip 200 may be controlled to satisfy $1.6 \leq (T1/T2) \leq 3.5$, and the ratio (A1/W2) of the width (A1) of the active portion A to the width (W2) of the second ceramic body 210 of the ceramic chip 200 may be controlled to satisfy less than 1.2, in particular, the ratio (A1/W2) of the width (A1) of the active portion A to the width (W2) of the second ceramic body 210 of the ceramic chip 200 may be controlled to satisfy 0.8 or more and 1.0 or less, to minimize influence of the acoustic noise generated in the multilayer ceramic capacitor 100, and to improve a mounting failure rate at the same time.

When the ratio (A1/W2) of the width (A1) of the active portion A to the width (W2) of the second ceramic body 210 of the ceramic chip 200 is less than 0.8, a coupling area of the multilayer ceramic capacitor and the ceramic chip may be reduced, to lower fixation strength.

When the ratio (A1/W2) of the width (A1) of the active portion A to the width (W2) of the second ceramic body 210 of the ceramic chip 200 exceeds 1.0, the width (W2) of the second ceramic body 210 of the ceramic chip 200 may be narrowed, to have an effect of reducing the acoustic noise, but to increase a mounting failure rate.

Therefore, the ratio (A1/W2) of the width (A1) of the active portion A to the width (W2) of the second ceramic body 210 of the ceramic chip 200 is preferable not to exceed 1.0, to have an effect of reducing the acoustic noise and reduce the mounting failure rate.

In the first embodiment of the present disclosure, a ratio (T1/W2) of the thickness (T1) of the multilayer ceramic capacitor 100 to a width (W2) of the second ceramic body 210 may satisfy 0.8 or more and 1.2 or less.

The ratio (T1/W2) of the thickness (T1) of the multilayer ceramic capacitor 100 to the width (W2) of the second ceramic body 210 may be controlled to satisfy 0.8 or more to 1.2 or less, to have an excellent effect of reducing acoustic noise, and improve the mounting failure rate.

When the ratio (T1/W2) of the thickness (T1) of the multilayer ceramic capacitor 100 to the width (W2) of the second ceramic body 210 is less than 0.8, a coupling area of the multilayer ceramic capacitor and the ceramic chip may be reduced, to lower fixation strength.

When the ratio (T1/W2) of the thickness (T1) of the multilayer ceramic capacitor 100 to the width (W2) of the second ceramic body 210 exceeds 1.2, the width (W2) of the second ceramic body 210 of the ceramic chip 200 may be narrowed, to have an effect of reducing the acoustic noise, but to increase a mounting failure rate.

Therefore, the ratio (T1/W2) of the thickness (T1) of the multilayer ceramic capacitor 100 to the width (W2) of the second ceramic body 210 is preferable not to exceed 1.2, to have an effect of reducing the acoustic noise and reduce the mounting failure rate.

Hereinafter, the multilayer ceramic capacitor 100 and the ceramic chip 200 constituting the composite body 300 will be described in detail.

Referring to FIGS. 2 and 3, the first ceramic body 110 constituting the multilayer ceramic capacitor 100 may be formed by stacking the plurality of dielectric layers 111, and a plurality of internal electrodes 121 and 122 (first and second internal electrodes in sequence) may be arranged in the first ceramic body 110 to be spaced apart from each other with each of the dielectric layers 111 interposed therebetween.

The plurality of dielectric layers 111 forming the first ceramic body 110 may be in a sintered state, and adjacent dielectric layers may be integrated with each other so that boundaries therebetween are not readily apparent.

The dielectric layer 111 may be formed by sintering a ceramic green sheet including ceramic powder particles, an organic solvent, and an organic binder. As the ceramic powder particles, a material having a high dielectric constant, a barium titanate ($BaTiO_3$)-based material, a strontium titanate ($SrTiO_3$)-based material, or the like, may be used, but is not limited thereto.

For example, the dielectric layers 111 constituting the first ceramic body 110 may include a ferroelectric material, but are not necessarily limited thereto.

According to the first embodiment of the present disclosure, the internal electrodes may include first internal electrodes 121 exposed from the first side surface of the composite body 300 in the length direction, and second internal electrodes 122 exposed from the second side surface thereof in the length direction, but are not necessarily limited thereto.

The first and second internal electrodes 121 and 122 may be formed of a conductive paste including a conductive metal.

The conductive metal may be nickel (Ni), copper (Cu), palladium (Pd), or alloys thereof, but is not limited thereto.

The first and second internal electrodes 121 and 122 may be printed on the ceramic green sheets forming the dielectric layers 111, using the conductive paste by a printing method such as a screen-printing method or a gravure printing method.

The ceramic green sheets on which the internal electrodes are printed may be stacked and sintered to form the first ceramic body 110.

The ceramic body 110 may include the active portion A as a portion contributing to formation of capacitance of the capacitor, and the cover portions C1 and C2 respectively formed opposing surfaces of the active portion A as margins.

The active portion A may be formed by repeatedly stacking the plurality of first and second internal electrodes 121 and 122 with the dielectric layer 111 interposed therebetween.

The upper and lower cover portions C1 and C2 may have the same material and configuration as those of the dielectric layer 111, except for not including the internal electrodes.

For example, the cover portions C1 and C2 may include a ceramic material, for example, a barium titanate (BaTiO$_3$)-based ceramic material.

The upper and lower cover portions C1 and C2 may each have a thickness of 20 μm or less, but are not necessarily limited thereto.

The plurality of first and second internal electrodes 121 and 122 may be disposed to be perpendicular to upper and lower surfaces of the first ceramic body 110.

In addition, the first and second external electrodes 131 and 132 may be formed of a conductive paste including a conductive metal. In this case, the conductive metal may be nickel (Ni), copper (Cu), palladium (Pd), gold (Au), or alloys thereof, but is not limited thereto.

In addition, nickel/tin (Ni/Sn) plating layers may be further disposed on the first and second external electrodes 131 and 132.

In an embodiment of the present disclosure, as the size of the multilayer ceramic capacitor 100 is reduced as described above, the size of the ceramic chip 200 may be also reduced, but the ratio of the thickness of the multilayer ceramic capacitor to the thickness of the ceramic chip, the ratio of the width of the active portion of the multilayer ceramic capacitor to the width of the ceramic body of the ceramic chip, and the ratio of the thickness of the multilayer ceramic capacitor to the width of the ceramic body of the ceramic chip may be controlled to minimize an effect of reducing acoustic noise, and to improve amounting failure rate at the same time.

According to the first embodiment of the present disclosure, the ceramic chip 200 may be coupled to the lower portion of the multilayer ceramic capacitor 100, and may be disposed under the multilayer ceramic capacitor 100.

The ceramic chip 200 may have a shape in which the first and second terminal electrodes 231 and 232 connected to the first and second external electrodes 131 and 132, respectively, are disposed, respectively, on the opposite end portions of the ceramic body 210 formed of ceramic having a bulk form.

Generally, there has been an attempt to insert an intermediate medium between a multilayer ceramic capacitor and a printed circuit board in order to significantly suppress vibrations of the multilayer ceramic capacitor from being transferred to the printed circuit board.

However, the intermediate medium, generally a resin used to manufacture the printed circuit board, is formed of a material having elasticity, and thus serves to absorb the vibrations of the multilayer ceramic capacitor by the elasticity of the intermediate medium.

According to the first embodiment of the present disclosure, since the second ceramic body 210 of the ceramic chip 200 is formed of only ceramic including a hard material that is not elastically deformed, the printed circuit board and the multilayer ceramic capacitor 100 may be spaced apart from each other by the ceramic chip 200. Therefore, the transfer of vibrations themselves generated from the multilayer ceramic capacitor 100 may be blocked.

According to the first embodiment of the present disclosure, the ceramic may include alumina (Al$_2$O$_3$).

Since the alumina (Al$_2$O$_3$) does not have piezoelectric characteristics, the alumina (Al$_2$O$_3$) may suppress the transfer of vibrations themselves generated from the multilayer ceramic capacitor 100. Therefore, the ceramic chip 200 including the alumina (Al$_2$O$_3$) may be disposed below the multilayer ceramic capacitor 100 to decrease acoustic noise.

The first and second terminal electrodes 231 and 232 may have, for example, double layer structures including first and second conductive resin layers disposed on an inner side and first and second plating layers disposed on an outer side, respectively, but are not particularly limited thereto.

According to the first embodiment of the present disclosure, as described above, since the first and second terminal electrodes 231 and 232 have the double layer structures including the first and second conductive resin layers disposed at the inner side and the first and second plating layers disposed at the outer side, respectively, when mechanical stress is applied from an external source, the transfer of the stress to the multilayer ceramic capacitor 100 may be suppressed by the ceramic chip 200 and the conductive resin layers used as the terminal electrodes 231 and 232 of the ceramic chip 200, such that damage due to a crack of the multilayer ceramic capacitor may be prevented.

Each of the first and second conductive resin layers may include a conductive metal and a thermosetting resin, and may include, for example, silver (Ag) and an epoxy resin, but are not limited thereto.

In the multilayer ceramic capacitor according to the first embodiment of the present disclosure, the plurality of first and second internal electrodes 121 and 122 may be disposed perpendicularly to the upper and lower surfaces of the first ceramic body 110.

For example, the first and second internal electrodes 121 and 122 may be stacked perpendicularly to a mounting surface at the time of mounting the composite body 300 on the printed circuit board.

Generally, when a voltage is applied to the multilayer ceramic capacitor, the ceramic body may be repeatedly expanded and contracted in the length, width and thickness directions by an inverse piezoelectric effect of the dielectric layers.

For example, when displacement amounts of a length-width surface (an L-W surface), a width-thickness surface (a W-T surface), and a length-thickness surface (an L-T surface) of the ceramic body are measured by a laser Doppler vibrometer (LDV), the displacement amounts may appear in a sequence of L-W surface>W-T surface>L-T surface.

The displacement amount of the L-T surface, about 42% of that of the W-T surface, may be smaller than that of the W-T surface. Therefore, it may be seen that stress having the same magnitude is generated in the L-T surface and the W-T surface, but particularly, the L-T surface has an area relatively greater than that of the W-T surface, and stress having a similar magnitude is thus distributed over a wide area of the L-T surface, such that a relatively low amount of deformation is generated in the L-T surface.

Therefore, it may be seen that the displacement amount of the L-T surface in a general multilayer ceramic capacitor is the smallest.

For example, according to the first embodiment of the present disclosure, the first and second internal electrodes 121 and 122 may be stacked perpendicular to the upper and lower surfaces of the first ceramic body 110, such that the first and second internal electrodes 121 and 122 may be disposed perpendicular to the mounting surface at the time of mounting the composite body 300 on the printed circuit board, and a vibration amount of a surface in contact with the ceramic chip 200 may be significantly decreased.

Figure 4:
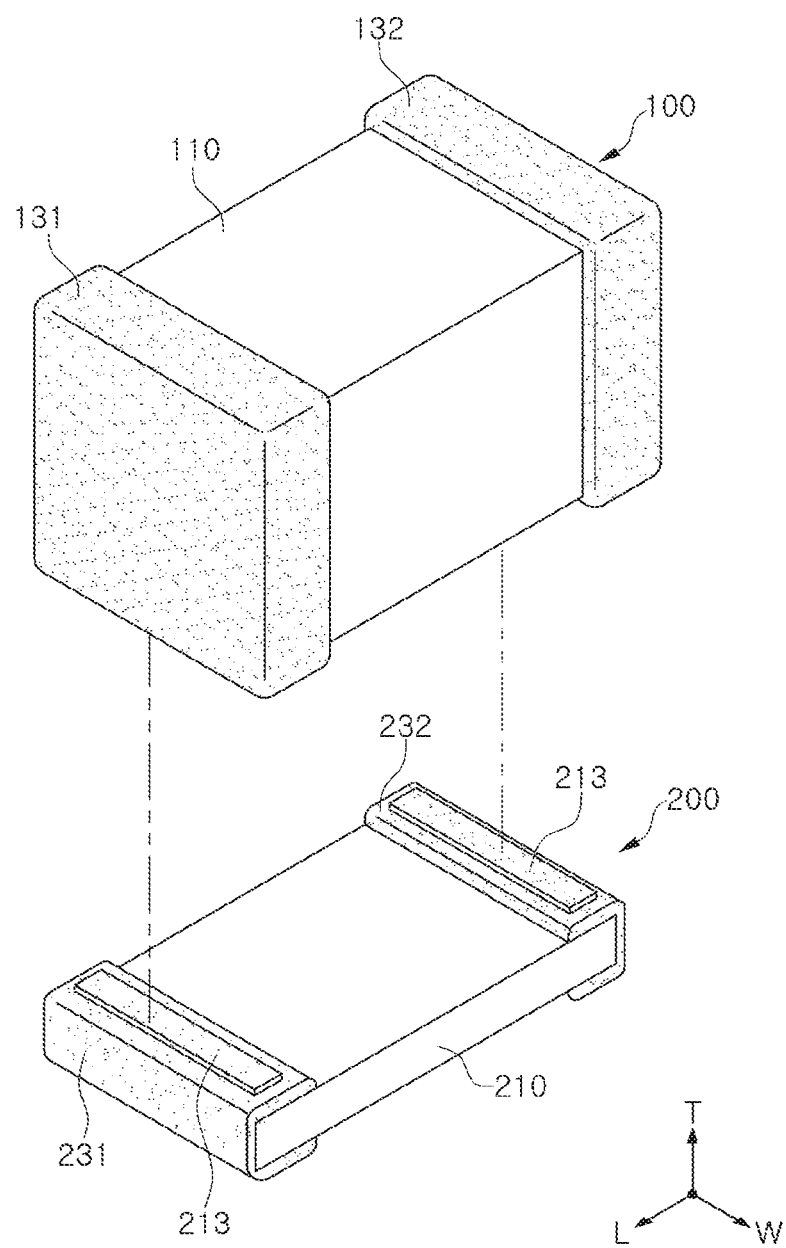
FIG. 4 is an exploded perspective view illustrating a multilayer ceramic capacitor and a ceramic chip of the composite electronic component of FIG. 1.

FIG. 4 is an exploded perspective view illustrating a multilayer ceramic capacitor and a ceramic chip of the composite electronic component of FIG. 1.

The composite body 300 may be formed by coupling the multilayer ceramic capacitor 100 and the ceramic chip 200 to each other. However, a method of forming the composite body 300 is not particularly limited.

The composite body 300 may be formed by coupling the multilayer ceramic capacitor 100 and the ceramic chip 200 that are separately attached to each other by the solder, the conductive adhesive 213, or the like.

The conductive adhesive 213 may be in the form of a paste including a conductive metal and an epoxy resin, but is not necessarily limited thereto.

Referring to FIG. 4, when the multilayer ceramic capacitor 100 and the ceramic chip 200 are coupled to each other through the solder, the conductive adhesive 213, or the like, the solder or the conductive adhesive 213 may be applied to the upper surfaces of the first and second terminal electrodes 231 and 232 to bond the first and second terminal electrodes 231 and 232 and the first and second external electrodes 131 and 132 of the multilayer ceramic capacitor 100, respectively.

The solder or the conductive adhesive 213 may be applied to the upper surfaces of the first and second terminal electrodes 231 and 232 to fix the ceramic chip 200 and the multilayer ceramic capacitor 100 to each other and thus allow only vibrations of a length-width surface (a L-W surface) of the first ceramic body 110 to be transferred to the ceramic chip 200.

Therefore, the stress and the vibrations generated from the multilayer ceramic capacitor may be significantly suppressed from being transferred to the ceramic chip, to decrease acoustic noise.

A composite electronic component according to the second embodiment of the present disclosure may include a composite body 300 formed by coupling a multilayer ceramic capacitor 100 and a ceramic chip 200 to each other, the multilayer ceramic capacitor 100 including a first ceramic body 110 in which a plurality of dielectric layers 111 and internal electrodes 121 and 122 disposed to face each other with each of the dielectric layers 111 are stacked, and first and second external electrodes 131 and 132 disposed on opposite end portions of the first ceramic body 110, respectively, and the ceramic chip 200 being disposed below the multilayer ceramic capacitor 100 and including a second ceramic body 210 including ceramic and first and second terminal electrodes 231 and 232 disposed on opposite end portions of the second ceramic body 210, respectively, and connected to the first and second external electrodes 131 and 132, respectively. A ratio (T1/W2) of a thickness (T1) of the multilayer ceramic capacitor 100 to a width (W2) of the second ceramic body 210 satisfies 0.8 or more to 1.2 or less.

The ratio (T1/W2) of the thickness (T1) of the multilayer ceramic capacitor 100 to the width (W2) of the second ceramic body 210 may be controlled to satisfy 0.8 or more to 1.2 or less, have a good effect of reducing acoustic noise and to improve a mounting failure rate.

When the ratio (T1/W2) of the thickness (T1) of the multilayer ceramic capacitor 100 to the width (W2) of the second ceramic body 210 is less than 0.8, a coupling area of the multilayer ceramic capacitor and the ceramic chip may be reduced, to lower fixation strength.

When the ratio (T1/W2) of the thickness (T1) of the multilayer ceramic capacitor 100 to the width (W2) of the second ceramic body 210 exceeds 1.2, the thickness of the multilayer ceramic capacitor 100 may be increased or the width (W2) of the second ceramic body 210 of the ceramic chip 200 may be narrowed, have an effect of reducing acoustic noise, but to increase a mounting failure rate.

Therefore, the ratio (T1/W2) of the thickness (T1) of the multilayer ceramic capacitor 100 to the width (W2) of the second ceramic body 210 is preferable not to exceed 1.2, to have an effect of reducing acoustic noise and reduce the mounting failure rate.

In addition, among the features of the composite electronic component according to the second embodiment of the present disclosure, the same portions as those of the composite electronic component according to the first embodiment of the present disclosure described above will be omitted in order to avoid redundant description.

Hereinafter, the present disclosure will be described in more detail with reference to experimental examples, but the present disclosure is not limited thereto.

EXPERIMENTAL EXAMPLE

Composite electronic components according to inventive examples and comparative examples of the present disclosure were manufactured as follows.

In the inventive examples and the comparative examples of the present disclosure, a ceramic chip may be manufactured to be disposed below a multilayer ceramic capacitor, according to amounting type of internal electrodes of the multilayer ceramic capacitor. Acoustic noise values and mounting failure rates according to the ratio (T1/T2) of the thickness (T1) of the multilayer ceramic capacitor 100 to the thickness (T2) of the ceramic chip 200, the ratio (A1/W2) of the width (A1) of the active portion A to the width (W2) of the second ceramic body 210 of the ceramic chip 200, and the ratio (T1/W2) of the thickness (T1) of the multilayer ceramic capacitor 100 to the width (W2) of the second ceramic body 210 were compared.

Specifically, the following Table 1 illustrates a comparison of acoustic noise values and mounting failure rates according to the ratio (T1/T2) of the thickness (T1) of the multilayer ceramic capacitor 100 to the thickness (T2) of the ceramic chip 200, and the ratio (A1/W2) of the width (A1) of the active portion A to the width (W2) of the second ceramic body 210 of the ceramic chip 200, in a case in which internal electrodes are stacked to be perpendicular to the mounting surface of the board.

TABLE 1

|  | T1/T2 | A1/W2 | Acoustic Noise (dBA) | Mounting Failure Rate (PPM) |
| --- | --- | --- | --- | --- |
| *1 | 1.6 | 1.20 | 24 | 600 |
| *2 | 2.0 | 1.20 | 25 | 200 |
| *3 | 3.5 | 1.20 | 26 | 200 |
| *4 | 5.0 | 1.20 | 33 | 100 |
| *5 | 6.0 | 1.20 | 37 | 100 |
| 6 | 1.6 | 1.0 | 25 | 0 |
| 7 | 2.0 | 1.0 | 26 | 0 |
| 8 | 3.5 | 1.0 | 26 | 0 |
| *9 | 5.0 | 1.0 | 32 | 0 |
| *10 | 6.0 | 1.0 | 34 | 0 |
| 11 | 1.6 | 0.8 | 25 | 0 |
| 12 | 2.0 | 0.8 | 26 | 0 |
| 13 | 3.5 | 0.8 | 27 | 0 |
| *14 | 5.0 | 0.8 | 34 | 0 |
| *15 | 6.0 | 0.8 | 35 | 0 |

*Comparative Examples

Referring to Table 1, in samples 1 to 5, which are comparative examples of the present disclosure, and cases in which the ratio (A1/W2) of the width (A1) of the active portion A to the width (W2) of the second ceramic body 210 of the ceramic chip 200 is 1.2, it can be seen that mounting failure rates thereof are relatively high, since these samples have high values beyond the numerical range of the present disclosure.

In samples 6 to 8, and 11 to 13, which are inventive examples of the present disclosure, and cases in which the ratio (T1/T2) of the thickness (T1) of the multilayer ceramic capacitor 100 to the thickness (T2) of the ceramic chip 200, and the ratio (A1/W2) of the width (A1) of the active portion A to the width (W2) of the second ceramic body 210 of the ceramic chip 200 satisfy the numerical range of the present disclosure, it can be seen that acoustic noise values thereof are relatively low, and there is no failure of mounting at the same time.

In samples 4, 5, 9, 10, 14, and 15, which are comparative examples of the present disclosure, and cases in which the ratio (T1/T2) of the thickness (T1) of the multilayer ceramic capacitor 100 to the thickness (T2) of the ceramic chip 200 exceeds 3.5, it can be seen that there is a problem that values for acoustic noise thereof exceed 30 dB.

The following Table 2 illustrates a comparison of acoustic noise values and mounting failure rates according to the ratio (T1/W2) of the thickness (T1) of the multilayer ceramic capacitor 100 to the width (W2) of the second ceramic body 210.

TABLE 2

|  | T1/W2 | Acoustic Noise (dBA) | Mounting Failure Rate (PPM) |
|---|---|---|---|
| *1 | 0.7 | 30 | 0 |
| 2 | 0.8 | 28 | 0 |
| 3 | 1.0 | 25 | 0 |
| 4 | 1.2 | 25 | 0 |
| *5 | 1.35 | 24 | 200 |
| *6 | 1.50 | 23 | 300 |

*Comparative Examples

Referring to Table 2, in sample 1, which is comparative example of the present disclosure, and a case in which the ratio (T1/W2) of the thickness (T1) of the multilayer ceramic capacitor 100 to the width (W2) of the second ceramic body 210 is less than 0.8, it can be seen that a value for acoustic noise value thereof is relatively high.

In samples 2 to 4, which are inventive examples of the present disclosure, and cases in which the ratio (T1/W2) of the thickness (T1) of the multilayer ceramic capacitor 100 to the width (W2) of the second ceramic body 210 satisfies the numerical range of the present disclosure, it can be seen that acoustic noise values thereof are relatively low, and there is no failure of mounting at the same time.

In samples 5 and 6, which are comparative examples of the present disclosure, and cases in which the ratio (T1/W2) of the thickness (T1) of the multilayer ceramic capacitor 100 to the width (W2) of the second ceramic body 210 exceeds 1.2, it can be seen to have an effect of reducing acoustic noise, but to increase a mounting failure rate.

According to an embodiment of the present disclosure, stress or vibrations depending on piezoelectric characteristics of the multilayer ceramic capacitor may be alleviated by the ceramic chip, such that acoustic noise generated from the circuit board may be decreased.

In particular, the ratio of the size of the multilayer ceramic capacitor to the size of the ceramic chip may be optimized, to maximize the effect of reducing acoustic noise, and to improve the mounting failure rate at the same time.

Specifically, the ratio of the thickness of the multilayer ceramic capacitor to the thickness of the ceramic chip and the width of the ceramic body of the ceramic chip, and the width of the active portion of the multilayer ceramic capacitor and the width of the ceramic body of the ceramic chip may be controlled, to maximize the effect of reducing acoustic noise, and to improve the mounting failure rate at the same time.

In addition, the internal electrodes of the multilayer ceramic capacitor may be stacked in a direction perpendicular to the mounting surface, and a surface of the multilayer ceramic capacitor in a length-width direction of which a piezoelectric displacement amount is small may be coupled to the ceramic chip to significantly suppress the stress and the vibrations generated from the multilayer ceramic capacitor from being transferred to the ceramic chip, such that acoustic noise may be decreased.

While example embodiments have been shown and described above, it will be apparent to those skilled in the art that modifications and variations could be made without departing from the scope of the present disclosure as defined by the appended claims.

What is claimed is:

1. A composite electronic component comprising:
a composite body including a multilayer ceramic capacitor and a ceramic chip coupled to each other,
wherein the multilayer ceramic capacitor includes a first ceramic body in which dielectric layers and internal electrodes disposed to face each other with one of the dielectric layers interposed therebetween are stacked, and first and second external electrodes disposed on opposite end portions of the first ceramic body, respectively,
the ceramic chip is disposed below the multilayer ceramic capacitor, and includes a second ceramic body including ceramic and first and second terminal electrodes disposed on opposite end portions of the second ceramic body, respectively, and connected to the first and second external electrodes, respectively,
a ratio (T1/T2) of a thickness (T1) of the multilayer ceramic capacitor to a thickness (T2) of the ceramic chip satisfies $1.6 \leq (T1/T2) \leq 3.5$,
the first ceramic body comprises an active portion including the internal electrodes disposed to face each other with the dielectric layer interposed therebetween, to form capacitance, and cover portions respectively disposed on opposing sides of the active portion, and
a ratio (A1/W2) of a width (A1) of the active portion to a width (W2) of the second ceramic body is 0.8 or more and less than 1.2.

2. The composite electronic component according to claim 1, wherein the ratio (A1/W2) is 1.0 or less.

3. The composite electronic component according to claim 1, wherein the width (A1) of the active portion is a distance between outermost internal electrodes among the internal electrodes.

4. The composite electronic component according to claim 1, wherein a ratio (T1/W2) of the thickness (T1) of the multilayer ceramic capacitor to the width (W2) of the second ceramic body is 0.8 or more and 1.2 or less.

5. The composite electronic component according to claim 1, wherein the internal electrodes of the first ceramic body are stacked perpendicularly to a mounting surface of the composite body.

6. The composite electronic component according to claim 1, wherein the internal electrodes of the first ceramic body are parallel to a stacking direction of the multilayer ceramic capacitor and the ceramic chip.

7. The composite electronic component according to claim 1, wherein the multilayer ceramic capacitor and the ceramic chip are coupled to each other by a solder or a conductive adhesive applied to an upper surface of the first terminal electrode and an upper surface of the second terminal electrode.

8. The composite electronic component according to claim 1, wherein the second ceramic body is made of alumina ($Al_2O_3$).

9. A composite electronic component comprising:

a composite body including a multilayer ceramic capacitor and a ceramic chip coupled to each other, wherein the multilayer ceramic capacitor includes a first ceramic body in which dielectric layers and internal electrodes disposed to face each other with one of the dielectric layers interposed therebetween are stacked, and first and second external electrodes disposed on opposite end portions of the first ceramic body, respectively, and the ceramic chip is disposed below the multilayer ceramic capacitor, and includes a second ceramic body including ceramic and first and second terminal electrodes disposed on opposite end portions of the second ceramic body, respectively, and connected to the first and second external electrodes, respectively, a ratio (T1/W2) of a thickness (T1) of the multilayer ceramic capacitor to a width (W2) of the second ceramic body is 0.8 or more and 1.2 or less, the first ceramic body comprises an active portion including the plurality of internal electrodes disposed to face each other with the dielectric layer interposed therebetween, to form capacitance, and cover portions respectively disposed on opposing sides of the active portion, and wherein a ratio (A1/W2) of a width (A1) of the active portion to the width (W2) of the second ceramic body is 0.8 or more and less than 1.2.

10. The composite electronic component according to claim 9, wherein the ratio (A1/W2) is 1.0 or less.

11. The composite electronic component according to claim 9, wherein the width (A1) of the active portion is a distance between outermost internal electrodes among the internal electrodes.

12. The composite electronic component according to claim 9, wherein the internal electrodes of the first ceramic body are stacked perpendicularly to a mounting surface of the composite body.

13. The composite electronic component according to claim 9, wherein the internal electrodes of the first ceramic body are parallel to a stacking direction of the multilayer ceramic capacitor and the ceramic chip.

14. The composite electronic component according to claim 9, wherein the multilayer ceramic capacitor and the ceramic chip are coupled to each other by a solder or a conductive adhesive applied to an upper surface of the first terminal electrode and an upper surface of the second terminal electrode.

15. The composite electronic component according to claim 9, wherein the second ceramic body is made of alumina ($Al_2O_3$).

* * * * *